United States Patent [19]
Spatafora et al.

[11] Patent Number: 5,680,747
[45] Date of Patent: Oct. 28, 1997

[54] METHOD AND APPARATUS FOR SECURING THE FACIALLY CONFRONTING OPPOSITE EDGE MARGINS OF A FOLDED-TO-TUBULAR PRODUCT WRAPPER OF HEAT-SEALABLE FILM MATERIAL

[75] Inventors: Mario Spatafora, Bologna; Andrea Berti, Castel S. Pietro Terme, both of Italy

[73] Assignee: Azionaria Costruzioni Automatiche A.C.M.A. S.P.A., Bologna, Italy

[21] Appl. No.: 613,255

[22] Filed: Mar. 8, 1996

[30] Foreign Application Priority Data

Mar. 10, 1995 [IT] Italy .................. BO95A0094

[51] Int. Cl.[6] .................................................. B65B 51/10
[52] U.S. Cl. .................. 53/477; 53/374.4; 53/DIG. 2; 53/450; 53/451; 53/551
[58] Field of Search .................. 156/582, 583.1; 53/DIG. 2, 374.4, 450–455, 550–555, 477

[56] References Cited

U.S. PATENT DOCUMENTS

| | | | |
|---|---|---|---|
| 4,288,967 | 9/1981 | Seko et al. | 53/374.4 |
| 4,637,199 | 1/1987 | Steck et al. | 53/374.4 |
| 4,731,980 | 3/1988 | Worden et al. | 53/551 |
| 4,819,414 | 4/1989 | Worden et al. | 53/551 |
| 4,825,625 | 5/1989 | Hufford | 53/551 |
| 5,117,613 | 6/1992 | Pfaffmann | 53/DIG. 2 |
| 5,282,349 | 2/1994 | Siegel | 53/550 |

FOREIGN PATENT DOCUMENTS

| | | | |
|---|---|---|---|
| 0 461 689 | 12/1991 | European Pat. Off. | B65B 9/06 |
| 1161902 | 8/1969 | United Kingdom | B65B 51/22 |
| 9304926 | 3/1993 | United Kingdom | 53/DIG. 2 |

Primary Examiner—John Sipos
Assistant Examiner—Gene L. Kim
Attorney, Agent, or Firm—Cushman Darby & Cushman Intellectual Property Group of Pillsbury Madison & Sutro LLP

[57] ABSTRACT

In a packaging machine through which products are advanced singly and in succession along a wrapping line together with a heat-sealable wrapping film, the film is folded around each product to form a wrapper of tubular appearance with two facially confronting longitudinal edge margins, whereupon the temperature of the edge margins is raised by electromagnetic induction to soften the material in readiness for heat-sealing. The pressure required to fuse the heated confronting edge margins together is applied evenly from two opposite sides.

5 Claims, 2 Drawing Sheets

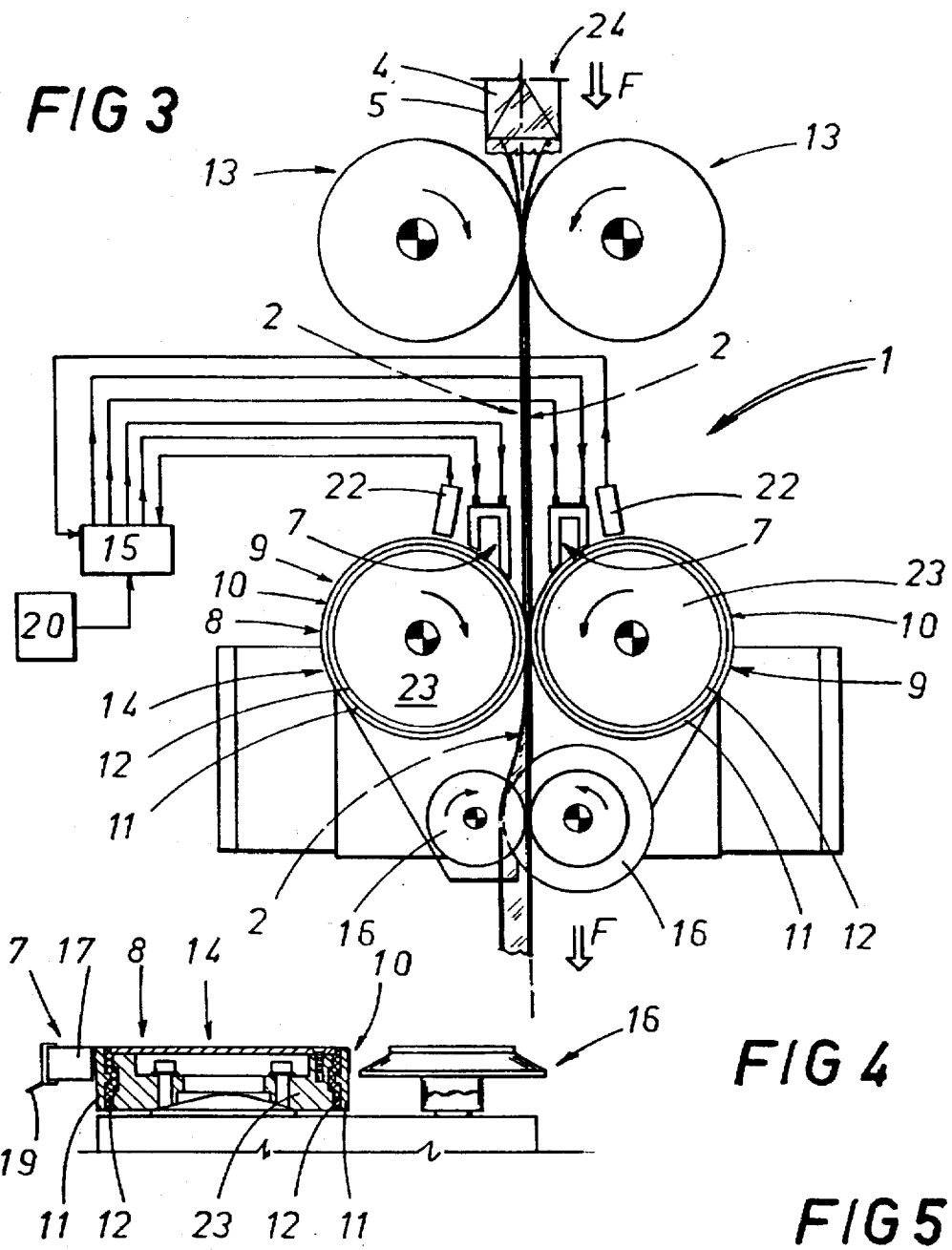
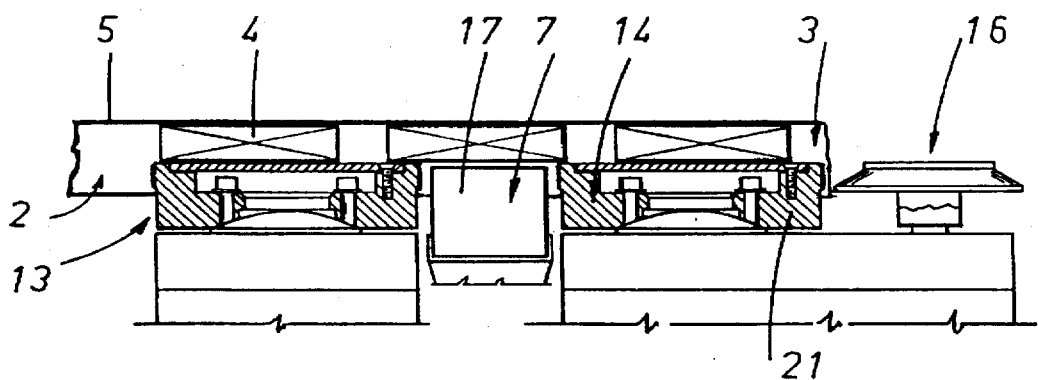

METHOD AND APPARATUS FOR SECURING THE FACIALLY CONFRONTING OPPOSITE EDGE MARGINS OF A FOLDED-TO-TUBULAR PRODUCT WRAPPER OF HEAT-SEALABLE FILM MATERIAL

BACKGROUND OF THE INVENTION

The present invention relates to a method of securing the facially confronting opposite edge margins of a folded-to-tubular wrapper of heat-sealable film material in wrapping machines.

The utilization of heat-sealable materials in the art field of packaging has long been known to have many advantages, given that it becomes possible to avoid the use of adhesives and similar substances for the purpose of securing wrappers around packages.

In a typical wrapping process, each individual product is enveloped in a wrapper made initially to assume a tubular shape with two longitudinal edge margins disposed in facially confronting juxtaposition and extending parallel to the feed direction.

The facially confronting edge margins are secured together by raising the temperature of the material locally to an optimum melting point for heat-seal purposes, and thereafter applying a compression or pinching force.

The operation of heat-sealing the facially confronting longitudinal edge margins of a wrapper in this way is performed currently by dynamic or static means consisting respectively in rollers or plates heated by electrical resistances. In the majority of cases, the operation is performed by a pair of rollers disposed on opposite sides of the facially confronting edge margins, by which the heat-sealable film material of the two facially confronting edge margins are warmed and compressed until mutual fusion occurs.

Given the high operating speeds of such machines and the rate of feed at which the facially confronting edge margins advance, the heat-seal rollers are raised to temperatures of a somewhat high order so that the facially confronting edge margins will be sure to unite during the brief periods for which the rollers and the material are brought into contact.

Heat-seal equipment constructed and operating in the manner outlined above tends to display a high thermal inertia, since the rollers remain at their operating temperature for a relatively long duration even after the electrical resistances have been deactivated. This signifies that most of the equipment currently in use is lacking in flexibility as regards control over the operating temperature of the rollers.

The impact of such a drawback is especially negative during those transient states, of whatever duration, in which the facially confronting edge margins may be caused to advance at a rate of feed other than the optimum. In particular, it may happen that a reduction in the operating speed of the equipment occurs for one reason or another, and consequently, the time for which the heat-seal rollers and the facially confronting edge margins remain in contact can be extended to the point that critical melt temperatures begin to register in the heat sealable film material.

One way to shorten the duration of the contact between the rollers and the facially confronting edge margins of the wrapper might be to distance the rollers one from the other and thus bring about their separation from the material; this is not possible in most instances however, since for reasons of structural and functional simplicity the rollers are also utilized as a means of advancing the wrappers along the feed direction. Another reason why the rollers cannot be separated from the material is that the two facially confronting edge margins may fail to unite through lack of compression. Similar problems of failure to obtain a successful heat-seal can also occur during positive thermal transients, or when the machine of which the equipment forms a part is switched on, likewise when the operating speed is increased for any reason.

SUMMARY OF THE INVENTION

The object of the present invention is to provide a method such as will allow of varying the temperature of heat-seal rollers by bringing them to an optimum heat-seal temperature according to the feed rate of an advancing material, and thus to overcome the drawbacks mentioned above.

The stated object is realized according to the present invention in a method of securing the facially confronting edge margins of a heat-sealable film material in machines designed to wrap products fed along a wrapping line.

The method disclosed comprises the steps of directing the film along the wrapping line while enveloping each of the products in a wrapper of tubular appearance that exhibits two facially confronting opposite longitudinal edge margins, heating the facially confronting edge margins by electromagnetic induction so as to obtain an optimum softening temperature in readiness for sealing, and compressing the facially confronting the joined edges until these edge margins are completely secured one to the other.

The stated object is realized similarly in equipment according to the present invention for securing the facially confronting edge margins of a heat-sealable film material, in wrapping machines; such equipment comprises means by which to envelop products individually in a wrapper of heat-sealable material presenting a tubular appearance and exhibiting two facially confronting opposite longitudinal edge margins, also means by which to feed the wrappers together with the respective products along a wrapping line, suitably proportioned electromagnetic induction means by which the facially confronting edge margins are heated to an optimum softening temperature in readiness to be sealed one to another, and compression means disposed and operating on opposite sides of the facially confronting edge margins.

The electromagnetic induction means are interlocked to a monitoring and control unit capable of sensing the rate at which the facially confronting edge margins advance and regulating the output of the electromagnetic induction means correspondingly.

BRIEF DESCRIPTION OF THE DRAWINGS

The invention will now be described in detail, by way of example, with the aid of the accompanying drawings, in which:

FIG. 3 is a schematic plan view of the equipment as in FIG. 1, illustrating a different embodiment;

FIG. 4 is a partly sectional schematic illustration showing details of FIG. 3, with certain parts omitted better to reveal others;

FIG. 5 is a partly sectional schematic illustration showing details of FIG. 1, with certain parts omitted better to reveal others.

DESCRIPTION OF THE PREFERRED EMBODIMENTS

Figure 1:
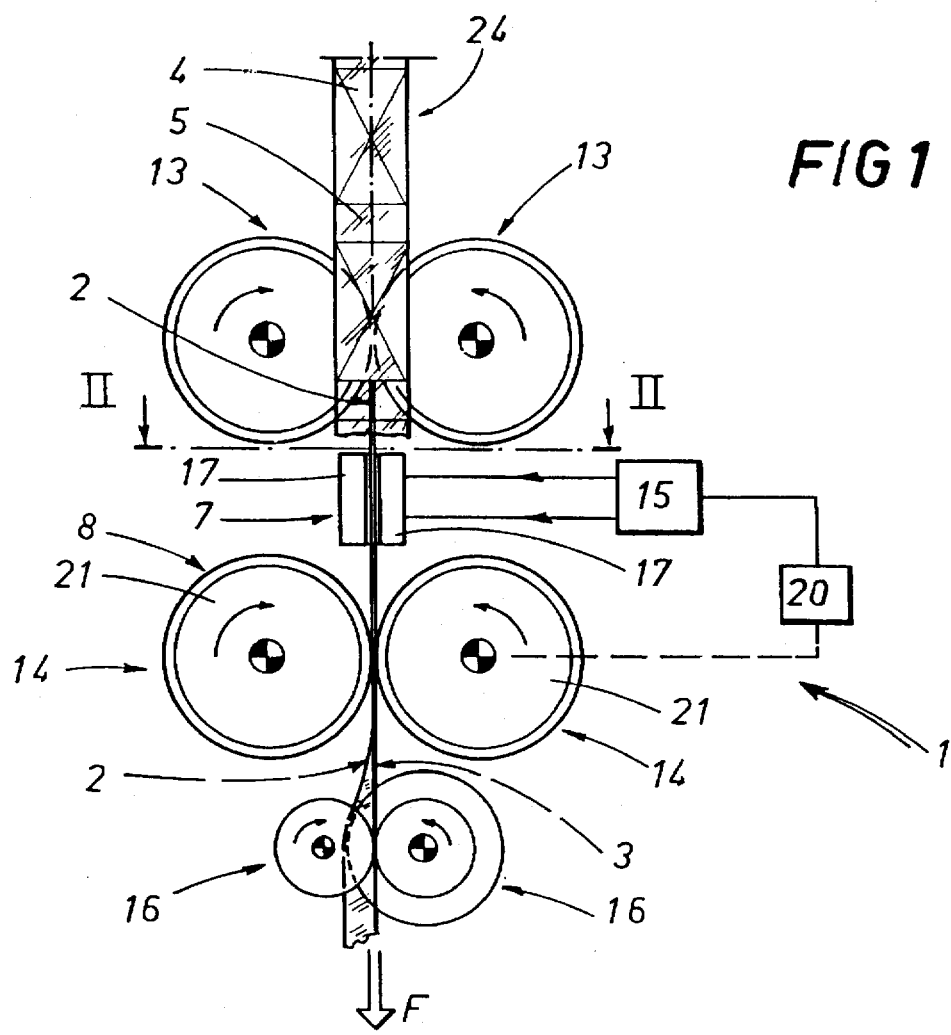
FIG. 1 is a schematic plan view of equipment according to the present invention.

With reference to the drawings, the present invention relates to a method of securing together the facially confronting opposite longitudinal edge margins, denoted 2, of a heat-sealable film material 3 as used typically in a machine designed to wrap products 4 fed along a relative wrapping line 24. The film 3 is advanced along the wrapping line 24 and folded around the single products 4 in such a manner that each product becomes enveloped in a wrapper 5 of tubular appearance with two facially confronting opposite longitudinal edge margins 2. The facially confronting edge margins 2 are heated by electromagnetic induction and brought thus to an optimum softening temperature for heat-sealing purposes, then compressed together until completely united one with another. As discernible in FIGS. 1 and 3, where F denotes the direction followed by the wrappers 5 along the wrapping line 24, the feed direction F coincides substantially with the length or longitudinal dimension of the edges 2.

Heat is generated utilizing electromagnetic induction means denoted 7 in the drawings, and might be applied directly (see FIGS. 1 and 2) by means 7 positioned on opposite sides of the advancing facially confronting edge margins 2, with which the material 3 itself makes no contact. The step of compressing the facially confronting edge margins follows the heating step and is performed by respective compression means 8.

The facially confronting edge margins 2 can be heated likewise indirectly, as illustrated in FIG. 3, locating the electromagnetic induction means 7 in close proximity to the revolving surfaces 10 provided by respective rollers 9 of low thermal capacity positioned on opposite sides of the facially confronting edge margins 2. The rollers 9 might be composed of an outer ring 11 fashioned from a material of low thermal capacity, and an inner ring or central core 12 of heat insulating material. The step of compressing together the facially confronting and heated edge margins 2 is effected by respective compression or pinching means 8 that could be located following the rollers 9 of low thermal capacity along the feed direction F, or alternatively, coinciding with the rollers 9 as indicated in FIG. 3. In both of the solutions described, that is to say with heat applied to the facially confronting edge margins 2 directly or indirectly, and in either instance utilizing the same electromagnetic induction means 7, thermal inertia is almost negligible and the temperature of the facially confronting edge margins 2 can be regulated swiftly in response to any variation in the rate at which the material is caused to advance along the wrapping line 24.

Equipment suitable for implementing the method thus described is denoted 1 in its entirety, and comprises a plurality of elements, arranged in sequence along the feed direction F followed by the wrappers 5 with their respective joined edges 2: enveloping means 13 by which the heat-sealable material 3 is bent around the products 4 to form a wrapper of tubular appearance with two facially confronting opposite longitudinal edge margins 2, electromagnetic induction means 7 serving to heat selected portions or areas 6 of the facially confronting edge margins 2, compression or pinching means 8 engaging the selected portions or areas 6, and folding means 16 by which the facially confronting and heat-sealed edge margins 2 are flattened against the wrapper 5 of which they form a part.

The enveloping means 13 are illustrated as a pair of rollers, conventional in embodiment, positioned on opposite sides of the facially confronting edge margins 2 and capable of fashioning the wrappers 5 around the products 4. In order to ensure that the structure of the equipment 1 can be readily appreciated, and since the disclosure is effectively pertinent only to the facially confronting edge margins 2, the wrapping material 3 and the respective products 4 are indicated in FIGS. 1 and 3 only along an incoming or initial stretch of the wrapping line 24 terminating substantially at the enveloping means 13, while only the facially confronting edge margins 2 are shown along the remaining part of the line.

The folding means 16 are similarly of conventional embodiment, being constituted by a pair of rollers disposed on opposite sides of the facially confronting edge margins 2.

Also indicated in FIGS. 1 and 3 are feed means 14 of which the function is to advance the wrappers 5 along the wrapping line 24. Such means 14 will be described further in due course.

Figures 2, 2A:
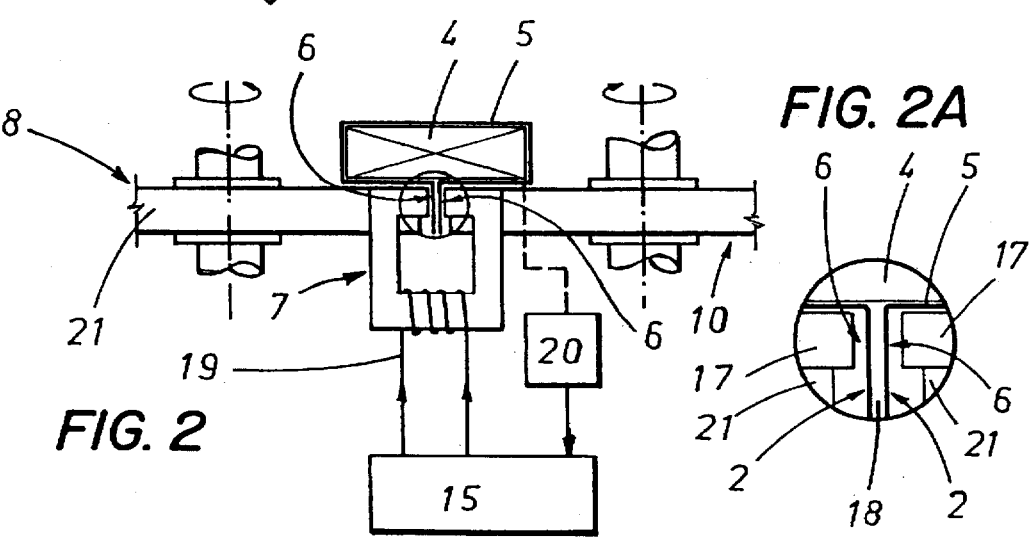
FIG. 2 is the section through II—II in FIG. 1.
FIG. 2A is an enlarged detail of the region shown circled in FIG. 2.

The electromagnetic induction means 7 are positioned following the enveloping means 13 with respect to the feed direction F, and in such a way as to heat the oncoming facially confronting edge margins 2 either directly as illustrated in FIGS. 1 and 2, or indirectly as in FIGS. 3 and 4.

Looking first at FIGS. 1 and 2, the electromagnetic induction means 7 are disposed on opposite sides of the facially confronting edge margins 2 and act directly on the material 3. In practice, the electromagnetic induction means 7 comprise a magnetic or magnetizable element 17 in the form of a ring or loop providing a small break, hence a gap 18, through which the facially confronting edge margins 2 are able to pass freely and without contact, also a conductor 19 coiled around the magnetic or magnetizable element 17 and energized electrically by a monitoring and control unit 15 of which one input is connected to the output of sensing means 20 serving to indicate the speed at which the wrappers 5 and the respective edges 2 advance along the feed direction.

The compression or pinching means 8, which in FIG. 1 are located following the electromagnetic induction means 7 along the feed direction F, comprise a pair of pressure rollers 21 disposed on opposite sides of the facially confronting edge margins 2 and maintained permanently in contact one with another, so that the interposed facially confronting edge margins 2 are squeezed or pressed firmly together. The revolving surfaces 10 of the pressure rollers 21, or at least the part of each roller offered to the facially confronting edge margins 2 (see FIG. 2), will also present roughened and matched profiles generated for example by milling or knurling. The pressure rollers 21 serve additionally to advance the facially confronting edge margins 2, and are one and the same as the aforementioned feed means 14. In the example of FIG. 1, accordingly, the speed sensing means 20 operate in conjunction with one of the pressure rollers 21. The equipment 1 disclosed is extremely simple and flexible, since the means by which the facially confronting edge margins 2 are heat-sealed consist only in the electromagnetic induction means 7 and the pressure rollers 21, while the monitoring and control unit 15 is set up in such a way as to respond to a variation sensed in the rate at which the facially confronting edge margins 2 are advanced by piloting a corresponding and proportional variation in the output of the electromagnetic induction means 7.

Departing from the notion of utilizing electromagnetic induction means 7 to generate heat, the inventors have sought to simplify the equipment 1 further through the expedient of heating the facially confronting edge margins 2 indirectly. In this instance, the electromagnetic induction means 7 are located in close proximity to rollers 9 of low thermal capacity in such a way that electromagnetic energy emitted by the means 7 is transmitted first to the rollers 9 and thence to the facially confronting edge margins 2. In the example of FIG. 3, electromagnetic induction means 7 comprise two magnetic or magnetizable elements 17 each located in close proximity to the revolving surface 10 of a respective roller 9, the rollers 9 of low thermal capacity being two in number and disposed on opposite sides of the advancing facially confronting edge margins 2. More exactly, one magnetic or magnetizable element 17 of "U" shape is associated with each roller 9, occupying a position close to the part of the revolving surface 10 offered in contact to the relative edge 2. Also associated with each roller 9, preceding the respective magnetic or magnetizable element 17 in the direction of rotation, are respective sensing means 22 capable of detecting the temperature of the adjacent revolving surface 10 and transmitting a corresponding output signal to the monitoring and control means 15.

In this solution, the monitoring and control means 15 are able to pilot a variation in the electromagnetic energy output of the electromagnetic induction means 7 not only according to the speed at which the facially confronting edge margins 2 advance along the wrapping line 24, but also to the temperature of the revolving surface 10 coming within the zone of effect of the electromagnetic induction means 7. More precisely, the thermal capacity of the rollers 9 is greater than that of the facially confronting edge margins 2, and accordingly, the temperature of the surfaces 10 must always be known in order to avoid overheating. The functions of monitoring the temperature of the revolving surfaces 10 of the rollers 9 and thereupon regulating the level of electromagnetic induction hold a special significance in the equipment 1 disclosed, since the rollers 9 of low thermal capacity will cool measurably from the point of ceasing contact with the facially confronting edge margins 2 to the point of returning within the operating zone of effectiveness of the electromagnetic induction means 7. These two operations had no significance in conventional types of equipment given that the heated rollers would effectively never cool down, by reason both of their high thermal capacity and of the high thermal inertia in the heating system overall.

The rollers 9 of low thermal capacity can be embodied in one piece, or preferably, as illustrated in FIGS. 3 and 4, composed of an outer ring 11 fashioned from a material of low thermal capacity and an inner ring or central core 12 of heat insulating material. In the particular case of FIG. 4, for reasons of engineering and construction, the inner ring or core 12 is shown as comprising a ring 12 of heat insulating material and a distinct central core 23.

To maximize the simplicity of the equipment 1, the rollers 9 of low thermal capacity are structured in such a way as to perform the additional function of the compression or pinching means 8 so that the facially confronting edge margins 2 can be heated and united in one and the same operation, hence instantaneously heat-sealed, without the drop in temperature that occurs when material is heated and compressed at separate stations. Again in this instance, the parts of the revolving surfaces 10 of the rollers 9 destined to come into contact with the facially confronting edge margins 2 will be roughened with matching profiles, for example milled or knurled, as already intimated with reference to FIG. 2. As to the facially confronting edge margins 2 themselves, moreover, these are heated across portions or areas 6 that typically will be continuous though of width less than the overall width of the facially confronting edge margins 2.

The monitoring and control unit 15 is programmed in such a way that the output from the electromagnetic induction means 7 will be just sufficient to heat the facially confronting edge margins 2, or rather the portions or areas 6 of the edges 2 destined to come into contact with the revolving surfaces 10 of the rollers 9, to an optimum heat-seal temperature, i.e. the temperature at which the heat-sealable material of the portions or areas 6 will readily soften and then fuse under the pressure of the selfsame rollers 9. Naturally, the programming of the monitoring and control unit 15 will be based on a given temperature of the outer ring 11. Upon detecting a variation in temperature of the outer ring 11, the relative sensing means 22 relay a corresponding signal to the monitoring and control means 15, which in turn will vary the output of the electromagnetic induction means 7 by a corresponding amount. The same occurs whenever the monitoring and control means 15 receive a signal from the speed sensing means 20 indicating that the facially confronting edge margins 2 have begun to advance at a faster or slower rate.

It will be clear that the equipment 1 is able to pilot a rapid variation in the output of electromagnetic energy used to heat the facially confronting edge margins 2 in response to a variation in the operating speed of the machine, and more exactly in the rate at which the facially confronting edge margins 2 advance along the wrapping line.

What is claimed:

1. A method for securing to one another the facially juxtaposed two opposite longitudinal edge margins of a strip of heat-sealable film material in a machine for wrapping products as the products are fed in succession along a product wrapping line, comprising:

directing the strip of heat-sealable film along the wrapping line so as to wrap each product in a wrapper of tubular appearance having two opposite longitudinal edge margins of the strip disposed in facial juxtaposition;

heating said two facially juxtaposed edge margins indirectly, by magnetic induction operating on heat transferors of low thermal capacity which operate on opposite outer faces of the edge margins as the strip of film material advances along the wrapping line, so as to raise the temperature of the edge margins to one at which the two juxtaposed edge margins are soft and ready to be seated together compressing the two softened and readied edge margins together until complete securement thereof to one another is achieved and said heat transferors are rollers disposed in rolling engagement with said outer faces and in close proximity to a source of electromagnetic induction.

2. The method claim 1, wherein:

said compressing is provided by rolling squeezing action of said rollers towards one another.

3. Apparatus for securing to one another the facially juxtaposed two opposite longitudinal edge margins of a strip of heat-sealable film material in a machine for wrapping products as the products are fed in succession along a product wrapping line, comprising:

rolls and guides directing the strip of heat-sealable film along the wrapping line so as to wrap each product in a wrapper of tubular appearance having two opposite longitudinal edge margins of the strip disposed in facial juxtaposition;

a source of electromagnetic induction operating on heat transferors of low thermal capacity for said two facially juxtaposed edge margins indirectly, by magnetic induction by operating on said heat transferors, said heat transferors being disposed to operate on opposite outer faces of the edge margins as the strip of film material advances along the wrapping line, so as to raise the temperature of the edge margins to one at which the two juxtaposed edge margins are soft and ready to be seated together a squeeze applicator for compressing the two softened and readied edge margins together until complete securement thereof to one another is achieved and said heat transferors are rollers disposed in rolling engagement with said outer faces and in close proximity to a source of electromagnetic induction.

4. The apparatus claim 3, wherein:

said rollers are mounted and arranged for providing said compressing, by rolling squeezing contact with said softened and readied edge margins.

5. The apparatus of claim 4, further comprising:

said rollers including roller surface temperature sensors disposed to act rotationally ahead of heating of said rollers by said source of electromagnetic induction; and a monitoring and control unit for providing feedback control to the source of electromagnetic induction based on sensing by said temperature sensors.

\* \* \* \* \*

UNITED STATES PATENT AND TRADEMARK OFFICE
CERTIFICATE OF CORRECTION

PATENT NO. : 5,680,747
DATED : October 28, 1997
INVENTOR(S) : SPATAFORA et al.

It is certified that error appears in the above-identified patent and that said Letters Patent is hereby corrected as shown below:

On the title page, item [73] should read:
--AZIONARIA COSTRUZIONI MACCHINE AUTOMATICHE A.C.M.A. S.p.A.--.

Signed and Sealed this

Fourteenth Day of April, 1998

Attest:

BRUCE LEHMAN

*Attesting Officer*  *Commissioner of Patents and Trademarks*